United States Patent [19]
Bennett, Jr.

[11] Patent Number: 5,636,889
[45] Date of Patent: *Jun. 10, 1997

[54] FLAT HOOK WITH SPRING LOADED LOCK-PIN

[75] Inventor: Tom Bennett, Jr., Richland Springs, Tex.

[73] Assignee: James B. Bonham Corp., Corsicana, Tex.

[ * ] Notice: The term of this patent shall not extend beyond the expiration date of Pat. No. 5,362,117.

[21] Appl. No.: 428,548

[22] Filed: Apr. 25, 1995

[51] Int. Cl.⁶ .................................................. B66C 1/36
[52] U.S. Cl. .................................. 294/82.23; 24/600.8
[58] Field of Search ........................... 294/82.1, 82.11, 294/82.17, 82.19–82.24, 82.35; 24/598.1, 598.3, 598.4, 598.7, 600.4, 600.5, 600.7, 600.8, 601.6, 68 R, 70 R

[56] References Cited

U.S. PATENT DOCUMENTS

| | | | |
|---|---|---|---|
| 1,419,974 | 6/1922 | McLaughlin | 294/82.35 |
| 1,475,046 | 11/1923 | Bolei | 294/82.23 |
| 2,232,997 | 2/1941 | Caldwell | 294/82.35 |
| 2,333,925 | 11/1943 | Grossett | 294/82.23 |
| 4,453,622 | 6/1984 | Betz | 294/82.35 |
| 4,530,135 | 7/1985 | Hsiang | 24/68 R |
| 4,622,721 | 11/1986 | Smetz et al. | 294/82.11 |
| 4,799,296 | 1/1989 | Rasmussen | 294/82.11 |
| 5,362,117 | 11/1994 | Bennett, Jr. | 294/82.23 |

FOREIGN PATENT DOCUMENTS

| 3305 | 1/1914 | United Kingdom | 294/82.35 |
|---|---|---|---|

*Primary Examiner*—Dean Kramer
*Attorney, Agent, or Firm*—Rossi & Associates

[57] ABSTRACT

A flat hook is provided with a retractable, spring loaded lock-pin that is used to retain the hook on a rail, pole, etc., extending through the throat of the hook. The lock-pin is either biased in a retaining position or a retracted position. A mechanism is provided to positively lock the lock-pin in the retaining position if desired.

9 Claims, 4 Drawing Sheets

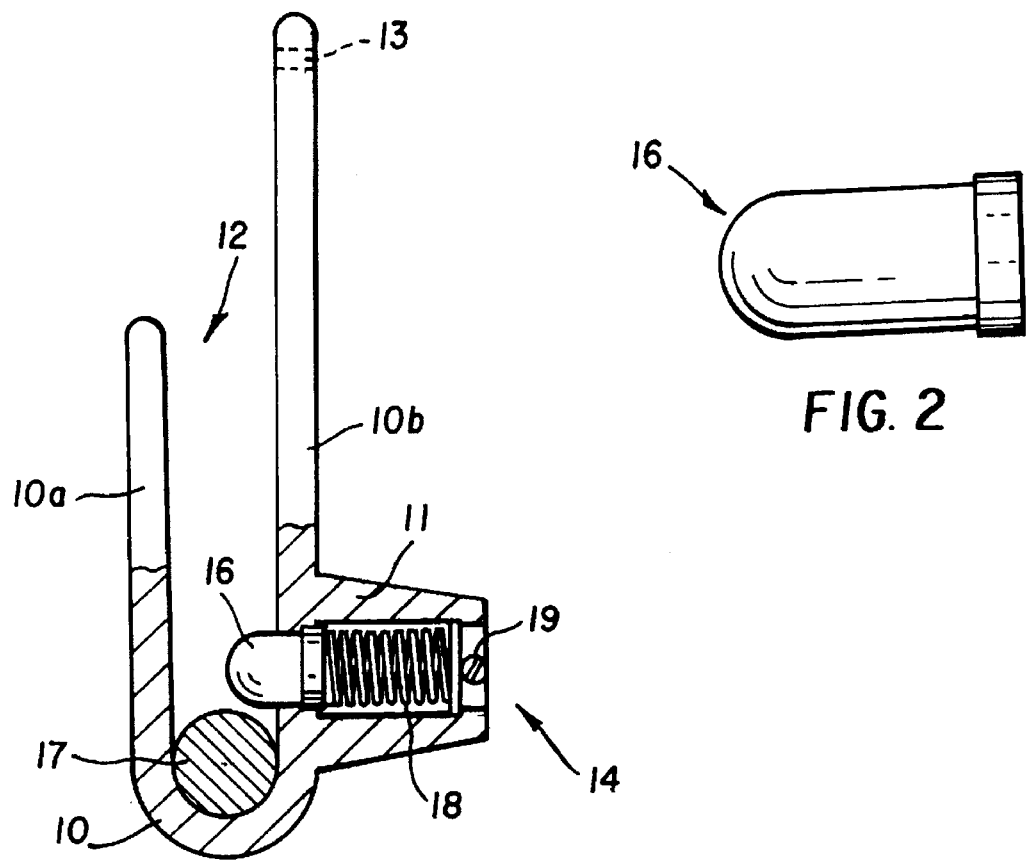
FIG. 1
FIG. 2
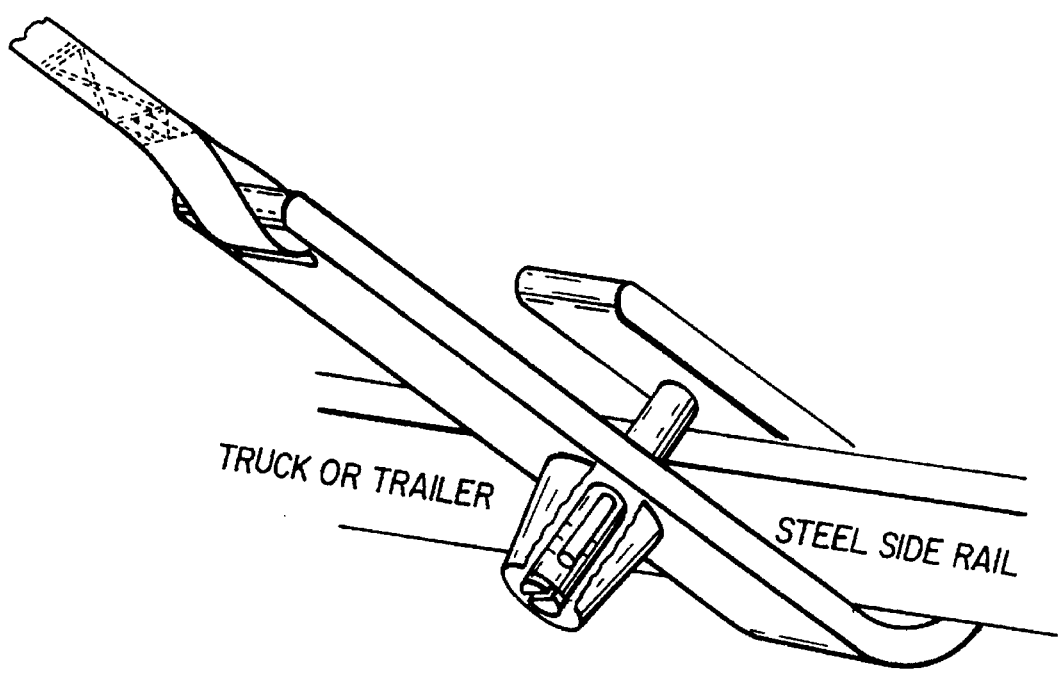
FIG. 3

FLAT HOOK WITH SPRING LOADED LOCK-PIN

FIELD OF THE INVENTION

The invention relates in general to hooks used primarily with chain or straps for lifting, towing and restraining loads. More specifically, the invention relates to flat grab or flat hooks and a mechanism for preventing the hook from slipping from a securing member to which it is to be secured.

BACKGROUND OF THE INVENTION

Hook and strap assemblies have commonly been employed to lift, tow or restrain loads. Generally, the hook and strap assemblies include at least one grab type hook having a throat which will accept and be secured against a securing member, such as a rail of a truck bed, for example. A common problem experienced with grab hooks, however, is that the hook will frequently slip from the securing member before tension is applied to the strap by a winch, for example. Thus, it is often required to reconnect the hook to the rail. The frequent slipping of the hook can cause a great deal wasted time and effort, as well as aggravation to an operator attempting to utilize the hook and strap assembly.

Although many efforts have been made to develop hooks with rail retaining features, the efforts to date have failed to produce a hook of simple and inexpensive design that can be reliably retained on a rail prior to the application of tension. It is therefore an object of the invention to provide a hook, of simple and inexpensive design, with a retaining mechanism for reliably retaining the hook on a rail which extends through the throat of the hook.

SUMMARY OF THE INVENTION

The invention provides a flat hook with a retractable, spring loaded lock-pin that is used to retain the hook on a rail, pole, etc., which extends in the throat of the hook. In a first embodiment, described in greater detail below, the lock-pin is normally biased in a retaining position. In other embodiments, the lock-pin is normally biased in a retracted position, and is movable to a locked retaining position. More specifically, in the first preferred embodiment, a flat hook is provided that includes a hook body having first and second spaced-apart flat legs which are joined together at one end to form a throat, a lock-pin reinforcing protrusion secured to an outer side surface of the first flat leg, the protrusion having a hole therein which also extends through the first leg, a lock-pin located within a hole provided in the hook body, and a biasing mechanism for biasing the lock-pin such that a portion of the lock-pin extends into the throat of the hook body. In the other embodiments, a hook is provided that includes a hook body having a throat, a movable lock-pin located within a hole provided in the hook body, a biasing mechanism for biasing the lock-pin in a retracted position within the hole, and locking means for positively locking the lock-pin in a retaining position.

BRIEF DESCRIPTION OF THE DRAWINGS

With the above as background, reference should now be made to the following detailed description of the preferred embodiments of the invention, wherein:

FIG. 1 is a side cross-sectional view of a flat grab hook in accordance with a first embodiment of the invention;

FIG. 2 is a detailed diagram of a lock-pin used in the first embodiment of the invention illustrated in FIG. 1;

FIG. 3 is a perspective view of a second embodiment of the invention;

DETAILED DESCRIPTION OF THE PREFERRED EMBODIMENTS

Figure 4:
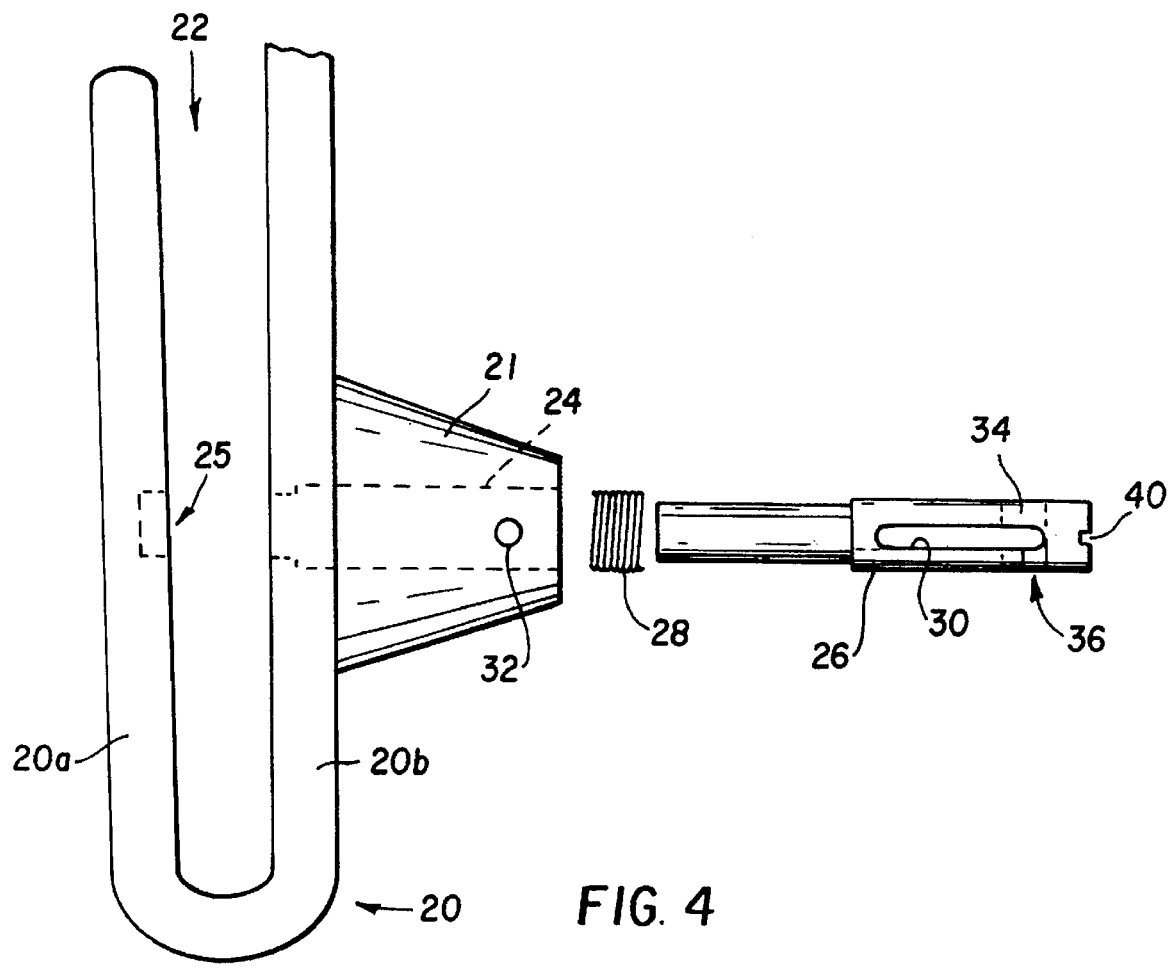
FIG. 4 is an exploded view of a flat grab hook in accordance with a second embodiment of the invention, as shown in FIG. 3.

Referring now to FIG. 1, a flat hook in accordance with the present invention is shown in cross-sectional side view. The hook includes a generally U-shaped curved hook body 10. The body 10 includes two flat legs 10a and 10b, spaced apart from each other extending substantially parallel to each other, and joined together at one end to from throat 12. A lock-pin reinforcing protrusion 11 of a type described in U.S. Pat. No. 5,362,117, the contents of which are incorporated herein by reference, is secured to an outer, flat side surface of leg 10b. Leg 10b has a receiving passage 13 for securing a strap thereto. The protrusion 11 is shown as a frustroconical member, but may be made any shape, as appropriate. Additionally, protrusion 11 may be secured to leg 10b by forming it integrally with the hook body, or by attaching it as separate member, the latter being particularly desirable for retro-fitting existing hooks. Additionally, protrusion 11 may be secured to opposite leg 10a.

A recess or hole 14 is formed in protrusion 11, and extends through the leg 10b. A lock-pin 16 is located in the hole 14. The tip of the lock-pin 16 is preferably rounded (as shown in greater detail in FIG. 2) and, depending on the application, the body of the lock-pin 16 is made from either a plastic material or metal such as steel. A spring 18 is preferably held partially compressed against the lock-pin 16 by a roll pin 19, such that the lock-pin 16 is spring loaded.

In operation, the hook is positioned such that a rail 17 extends through the throat 12 of the hook. The force of the rail against the lock-pin 16 causes the lock-pin 16 to retract and compress the spring 18. Once the rail has passed the lock-pin 16, the expansion force of the spring 18 pushes the lock-pin 16 into its original position. The lock-pin 16 extends into the throat 12, thereby preventing the hook from slipping from the rail 17. The retention force can be varied, based on the application, by utilizing springs having different spring forces.

While the first embodiment described above provides an improvement over conventional hook designs, it may be desirable to provide a hook with a lock-pin that can be positively locked into position for securing heavy loads. Referring now to FIG. 4, a second embodiment of hook in accordance with the invention is shown that includes a lock-pin that can be positively locked. The hook includes a curved hook body 20 having leg portions 20a and 20b, similar to leg 10a and 10b of the embodiment of FIG. 1, which form a throat 22. A lock pin reinforcing protrusion 21 is secured to an outer surface of leg 20b. A recess or hole 24 is formed in the protrusion 21 and through leg 20b. Preferably, a corresponding retaining hole 25 is formed in leg 20a, opposite the first hole 24, although the hole 25 can be omitted. A lock-pin 26 is located in the hole 24, but—in this case—a spring 28 is provided between the hook body and the lock-pin 26 as shown in greater detail in FIG. 5.

Figure 6:
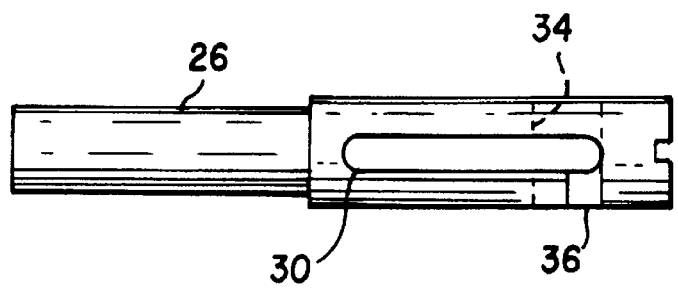
FIG. 6 is a first view of a lock-pin used in the hook illustrated in FIG. 4.
Figure 7:
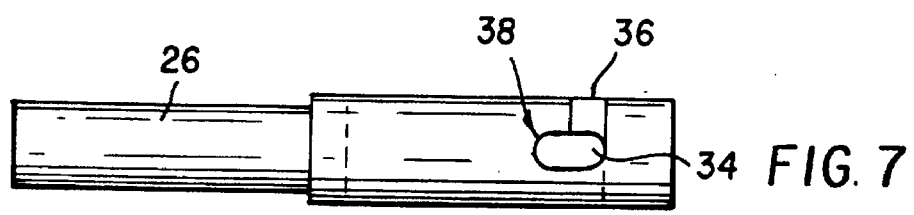
FIG. 7 is a second view of the lock-pin illustrated in FIG. 6.

The lock-pin 26 includes a first lock-slot 30 that cooperates with a roll pin 32 to permit movement of the lock-pin 26 within the hole 24, while preventing the lock-pin 26 from sliding out of the hole under the force of the spring 28, i.e. the lock-pin 26 can be moved back and forth with the roll pin 32 being located within the first lock-slot 30. A second lock-slot 34, rotated 90 degrees from the first lock-slot 30, is also provided in the lock-pin 26. A passage 36 is provided between the first lock-slot 30 and the second lock-slot 34 that permits the lock-pin 26 to be rotated until the second-lock slot 34 is aligned with the roll pin 32 (See FIGS. 6 and 7).

Figure 5:
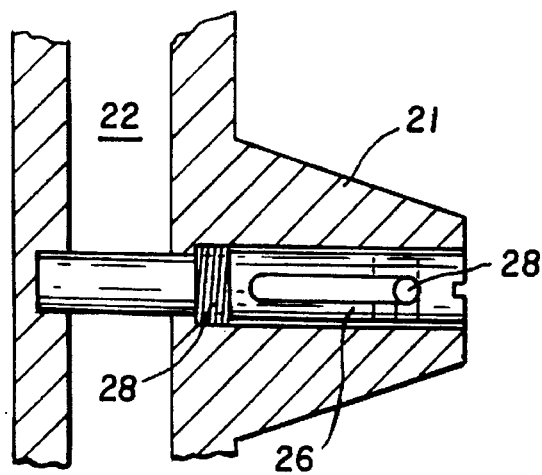
FIG. 5 is a cross-sectional view of the hook illustrated in FIG. 4.

In order to permit rotation of the lock-pin 26, a force must be applied to compress the spring 28 to align the roll pin 32 with the passage 36 as shown in FIG. 5. The lock-pin 26 is then turned until the roll pin 32 is aligned with the second-lock slot 34. The lock-pin 26 preferably incorporates a slot 40 to permit a screw driver, coin or other implement to be used in turning the lock-pin 26. The compression force is then released, and the expansion force of the spring 28 pushes the lock-pin 26 outward until the roll pin 32 meets a face 38 of the second lock-slot 34 shown in FIG. 7.

Figure 8:
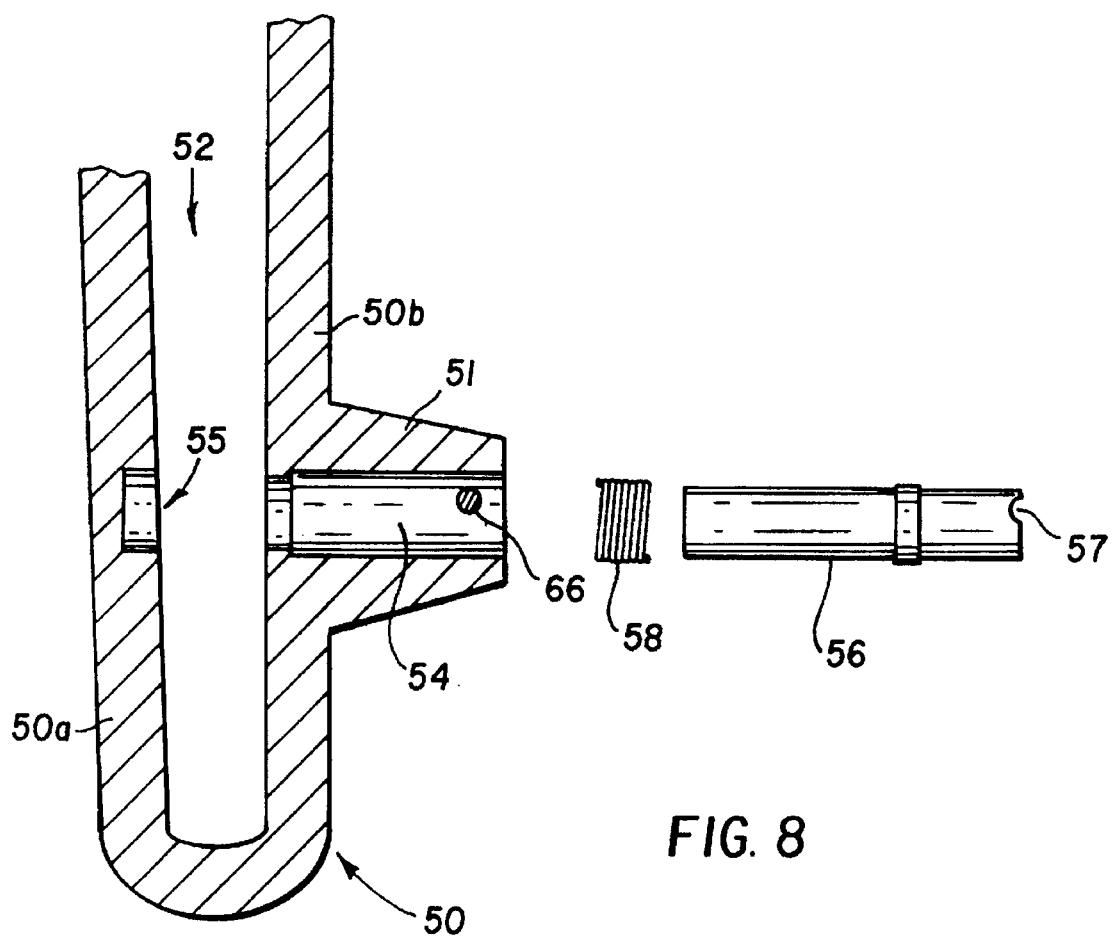
FIG. 8 is an exploded view of a flat grab hook in accordance with a third embodiment of the invention.

The second embodiment illustrated in FIG. 4 provides a lock-pin that can be positively locked to be positively secured to a rail passing through the throat of the hook. The design of the lock-pin to include the first and second lock-slots, however, is somewhat complicated to manufacture. A third embodiment of the invention incorporating a lock-pin of less complicated design that can be positively locked is shown in FIG. 8. The hook of the third embodiment includes a curved hook body 50 having spaced apart legs 50a and 50b that form a throat 52. A lock pin reinforcing protrusion 51 is secured to an outer side surface of leg 50b. A recess or hole 54 is formed in the leg 50b and through protrusion 51. Preferably, as with the second embodiment, a corresponding retaining hole 55 is formed in the other leg, leg 50a, opposite the first hole 54. A lock-pin 56 is located in the hole 54 and a spring 58 is provided between the hook body and the lock-pin 56.

Figure 9:
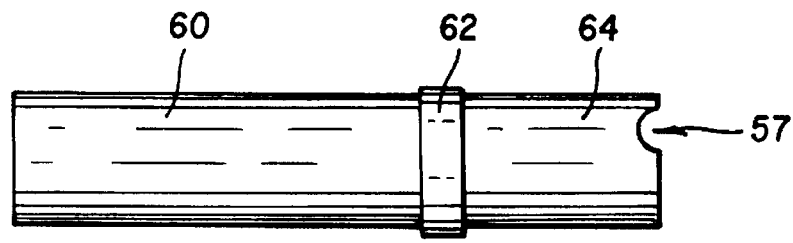
FIG. 9 illustrates a top view of a lock-pin used in the hook illustrated in FIG. 8.
Figure 10:
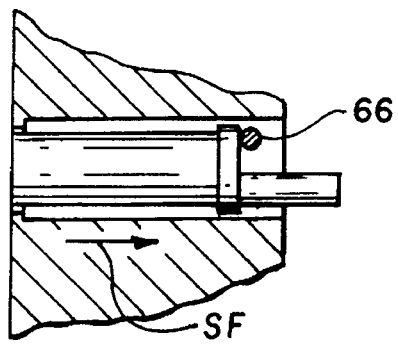
FIG. 10 illustrates the lock-pin of FIG. 9 located within the hook body of the hook illustrated in FIG. 8, wherein the lock-pin is in a retracted position.
Figure 11:
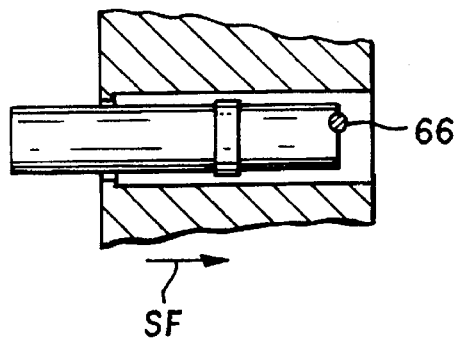
FIG. 11 illustrates the lock-pin of FIG. 9 located within the hook body of the hook illustrated in FIG. 8, wherein the lock-pin is in a locked retaining position.

In this embodiment, the lock-pin 56 includes a rail retainer portion 60, a spring retainer portion 62 and a roll pin locking portion 64 as shown in FIG. 9. The rail retainer portion 60 and the spring retainer portion 62 are substantially cylindrical, while the roll pin locking portion 64 is a half cylinder or flat protrusion. In operation, the spring 58 pushes against the spring retainer portion 62 to push the lock-pin 56 outward until an outer face of the spring retainer portion 62 contacts a roll pin 66. The roll pin locking portion 64 passes under the roll pin 66 as shown in FIG. 10. In this position, the rail retainer portion 60 is retracted from the throat 52 of the hook. In order to lock the rail retainer portion 60 into the throat 52, a force is applied to the lock-pin 56 to compress the spring 58. The lock-pin 56 is then rotated until a roll pin retaining groove 57 on the end of the lock-pin 56 is aligned with the roll pin 66. The force is then released and the expansion force of the spring 58 pushes the lock-pin 56 outward until the roll pin 66 engages to roll pin retaining groove. In this position, the rail retainer portion 60 extends into the throat 52 to retain a rail and the lock-pin 56 is positively locked by the placement of the roll pin 66 into the roll pin retaining groove as shown in FIG. 11. It should be noted that the spring 58 has been omitted from FIGS. 10 and 11 for clarity.

Figure 12:
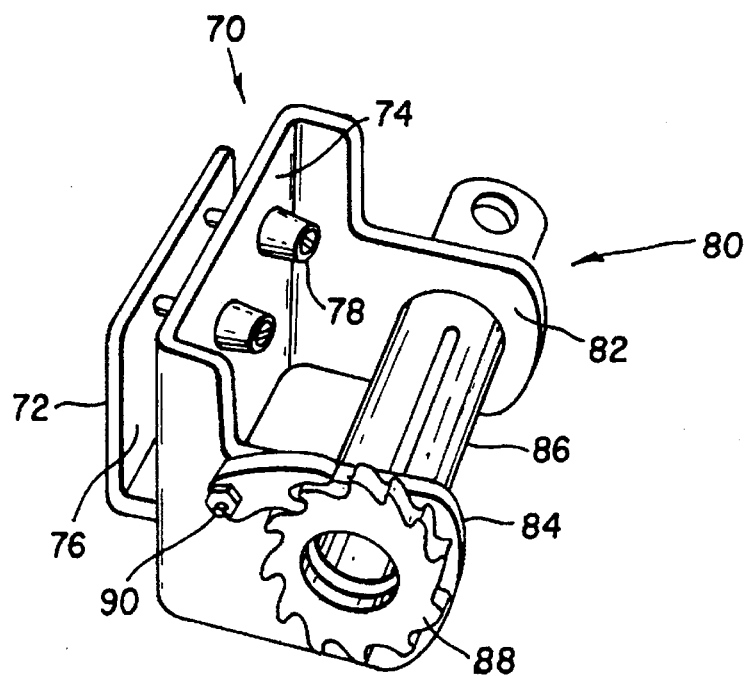
FIG. 12 illustrates a further embodiment of the invention in which a winch structure is incorporated with the flat hook.

FIG. 12 illustrates a further embodiment of the invention in which the flat hook described above is combined with a winch structure. As shown in FIG. 12, a flat hook 70 in accordance with the invention includes a first leg 72 and a second leg 74 that forms a throat 76. The first leg 72 preferably incorporates two lock-pins 78 of the type described above, although one can be utilized, and is attached to a winch structures 80 that includes a first side extending members 82, a second side extending member 84, an axle or roll pin 86, a toothed wheel 88 attached to the axle 86, and a rachet mechanism 90 located on the second side extending member 84 that interfaces with the toothed wheel 88 to selectively lock the axle 86 in a fixed position. The incorporation of the hook structure with the winch structure permits the winch to be readily attached to the side rails of trucks or other structures. It will be readily appreciated that the second leg 74 and the first and second side extending members 82, 84 may be formed from a single piece of material to reduce manufacturing costs, although separate pieces that are coupled together may also be employed.

The invention has been described with reference to certain preferred embodiments thereof. It will be understood, however, that modifications and variations are possible within the scope of the appended claims. For example, the placement of lock-pins on the body of the hook can be varied. Differently shaped lock pins can also be employed. In addition, the pin can be replaced with other elements to retain the spring within the hole. For example, in the first embodiment, the hole can be threaded and a screw can be used to retain the spring within the hole. Finally, as was mentioned above, the pin is not required to pass into a hole provided in a leg of the hook, but instead, can simply extend into the throat. Other modifications, encompassed by the scope of the claims, will be apparent to those of ordinary skill in the art.

What is claimed is:

1. A flat hook comprising:
   a hook body including first and second spaced-apart flat legs which are joined together at one end to form a throat;
   a lock-pin reinforcing protrusion secured to an outer side surface of the first leg, said protrusion having a hole therethrough, said hole extending through the first leg;
   a movable lock-pin located within the hole extending through the first leg and protrusion;
   biasing means for biasing the lock-pin in a retracted position within the hole; and
   locking means for positively locking the lock-pin in a retaining position;
   wherein the lock-pin includes a first lock-slot, a second lock-slot and a passage connecting the first lock-slot to the second lock-slot.

2. A flat hook as claimed in claim 1, wherein the locking means further includes a pin that passes through the hole and cooperates with the first lock-slot, the second lock-slot and the passage to permit the movement of the lock-pin from the retracted position to the retaining position.

3. A flat hook as claimed in claim 1, further comprising: first and second side extending members extending from the first leg; an axle supported by the first and second side extending members; and locking means for selectively locking the axle in a fixed position.

4. A flat hook as claimed in claim 3, wherein said locking means for selectively locking the axle includes a toothed wheel attached to one end of the axle and a rachet mechanism attached to at least one of the first and second side extending members, wherein the rachet mechanism interfaces with the toothed wheel to prevent rotation of the axle.

5. A flat hook comprising:

a hook body including first and second spaced-apart flat legs which are joined together at one end to form a throat;

a lock-pin reinforcing protrusion secured to an outer side surface of the first leg, said protrusion having a hole therethrough, said hole extending through the first leg;

a movable lock-pin located within the hole extending through the first leg and protrusion;

biasing means for biasing the lock-pin in a retracted position within the hole; and locking means for positively locking the lock-pin in a retaining position;

wherein the lock-pin includes a rail retainer portion for traversing at least a portion of the throat, a spring retainer portion extending from the rail retainer portion, and a roll pin locking portion extending from the rail retainer portion; and wherein the locking means includes a pin that passes through the hole, wherein the pin contacts an outside face of the spring retainer portion to hold the lock-pin in a retracted position and contacts a roll pin retaining groove provided on the end of the roll pin locking portion to hold the lock-pin in a locked retaining position.

6. A flat hook as claimed in claim 5, wherein the biasing means comprises a spring.

7. A flat hook as claimed in claim 5, further comprising a receiving passage formed in a second end of one of said first and second legs, for receiving a strap.

8. A flat hook as claimed in claim 5, further comprising: first and second side extending members extending from the first leg; an axle supported by the first and second side extending members; and locking means for selectively locking the axle in a fixed position.

9. A flat hook as claimed in claim 8, wherein said locking means for selectively locking the axle includes a toothed wheel attached to one end of the axle and a rachet mechanism attached to at least one of the first and second side extending members, wherein the rachet mechanism interfaces with the toothed wheel to prevent rotation of the axle.

* * * * *